US012314177B2

United States Patent
Harris et al.

(10) Patent No.: US 12,314,177 B2
(45) Date of Patent: *May 27, 2025

(54) MANAGING POWER LOSS RECOVERY USING A DIRTY SECTION WRITE POLICY FOR AN ADDRESS MAPPING TABLE IN A MEMORY SUB-SYSTEM

(71) Applicant: Micron Technology, Inc., Boise, ID (US)

(72) Inventors: Byron Harris, Mead, CO (US); Daniel Boals, Broomfield, CO (US); Abedon Madril, Frederick, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,248

(22) Filed: Feb. 15, 2024

(65) Prior Publication Data

US 2024/0184695 A1 Jun. 6, 2024

Related U.S. Application Data

(63) Continuation of application No. 17/683,980, filed on Mar. 1, 2022, now Pat. No. 11,940,912.

(51) Int. Cl.
*G06F 12/00* (2006.01)
*G06F 3/06* (2006.01)
*G06F 12/0802* (2016.01)

(52) U.S. Cl.
CPC ........ *G06F 12/0802* (2013.01); *G06F 3/0619* (2013.01); *G06F 3/0655* (2013.01); *G06F 3/0679* (2013.01); *G06F 2212/60* (2013.01); *G06F 2212/7201* (2013.01)

(58) Field of Classification Search
CPC ............... G06F 12/0802; G06F 3/0619; G06F 3/0655; G06F 3/0679; G06F 2212/60; G06F 2212/7201
USPC ........................................................ 711/118
See application file for complete search history.

(56) References Cited

U.S. PATENT DOCUMENTS

| 11,537,512 | B2 | 12/2022 | Winterfeld et al. |
| 2017/0242584 | A1 | 8/2017 | Zhang et al. |
| 2022/0043746 | A1* | 2/2022 | Winterfeld ............ G06F 1/3275 |

FOREIGN PATENT DOCUMENTS

CN 107766257 A 3/2018

* cited by examiner

*Primary Examiner* — Mardochee Chery
(74) *Attorney, Agent, or Firm* — Lowenstein Sandler LLP (57) ABSTRACT

A total count for an address mapping table is maintained, wherein the total count reflects a total number of updates to the address mapping table, and wherein the address mapping table comprises a plurality of sections. Respective section counts for the plurality of sections are maintained, wherein each respective section count reflects a total number of updates to a corresponding section. It is determined that the total count for the address mapping table satisfies a threshold criterion. A first section of the plurality of sections with a highest section count is identified based on the respective section counts. The first section of the address mapping table is written to a non-volatile memory device.

20 Claims, 5 Drawing Sheets

FIG. 1

Dirty Count Table 210

| | |
|---|---|
| Section 201 Dirty Count | 2 |
| Section 202 Dirty Count | 0 |
| Section 203 Dirty Count | 4 |
| Section 204 Dirty Count | 1 |
| Section 205 Dirty Count | 3 |
| Total L2P Table Dirty Count | 10 |

L2P Table 200

| Section 201 | Section 202 | Section 203 | Section 204 | Section 205 |
|---|---|---|---|---|
| Entry 201a | Entry 202a | Entry 203a | Entry 204a | Entry 205a |
| Entry 201b | Entry 202b | Entry 203b | Entry 204b | Entry 205b |
| Entry 201c | Entry 202c | Entry 203c | Entry 204c | Entry 205c |
| Entry 201d | Entry 202d | Entry 203d | Entry 204d | Entry 205d |
| Entry 201e | Entry 202e | Entry 203e | Entry 204e | Entry 205e |

MANAGING POWER LOSS RECOVERY USING A DIRTY SECTION WRITE POLICY FOR AN ADDRESS MAPPING TABLE IN A MEMORY SUB-SYSTEM

RELATED APPLICATIONS

The present application is a continuation of co-pending U.S. patent application Ser. No. 17/683,980, filed on Mar. 1, 2022, which is incorporated herein by reference in its entirety for all purposes.

TECHNICAL FIELD

Embodiments of the disclosure relate generally to memory sub-systems, and more specifically, relate to managing power loss recovery using a dirty section write policy for an address mapping table in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to managing power loss recovery using a dirty section write policy for an address mapping table in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Data operations can be performed by the memory sub-system. The data operations can be host-initiated operations. For example, the host system can initiate a data operation (e.g., write, read, erase, etc.) on a memory sub-system. The host system can send access requests (e.g., write commands, read commands) to the memory sub-system, such as to store data on a memory device of the memory sub-system or to read data from the memory device of the memory sub-system. The data to be read or written, as specified by a host request, is hereinafter referred to as "host data." A host request can include a logical address (e.g., a logical block address (LBA) and namespace) for the host data, which is an identifier that the host system associates with the host data. The logical address information (e.g., LBA, namespace) can be part of metadata for the host data. Metadata can also include error handling data (e.g., ECC codeword, parity code), a data version (e.g., used to distinguish age of data written), a valid bitmap (specifying which LBAs contain valid data), etc.

In order to isolate from the host system various aspects of physical implementations of memory devices employed by memory sub-system, the memory sub-system controller can maintain a data structure that maps each LBA to a corresponding physical address (PA). For example, for flash memory, the physical address can include channel identifier, die identifier, page identifier, plane identifier and/or frame identifier. The mapping data structure is referred to herein as a logical-to-physical (L2P) table. The L2P table can be segmented into multiple sections. Each section can have a number of regions, and each region can include a number of mapping entries. The L2P table is maintained by the firmware of the memory sub-system controller and is stored on one or more non-volatile memory devices of the memory sub-system. In order to improve the overall efficiency of the data transfer between a host system and a memory sub-system, the L2P table can be at least partially cached by one or more volatile memory devices of the memory sub-system, such that the cached portions of the L2P table can be accessed with lower latency.

The memory sub-system controller can save (e.g., write) updated (i.e., dirty) section(s) of the cached L2P table to a non-volatile memory device in the memory sub-system. Caching the dirty sections of the L2P table in volatile memory can allow for memory sub-systems to efficiently locate data during read operations. Further, saving the dirty sections of the L2P table to the non-volatile memory device can allow for reconstructing the L2P table after a power loss event. However, saving the dirty section(s) of the L2P table to the non-volatile memory device after each write operation and update to the cached portions of the L2P table can be expensive in terms of time and resources. Thus, in certain memory sub-systems, the memory sub-system controller can use a round robin policy where snapshots of the sections of the L2P table are periodically saved to a non-volatile memory device, such as upon writing a certain number of pages. However, in the round robin policy, sections of the L2P table are saved to the non-volatile memory device without regard to whether the sections are dirty (i.e., have been updated). Furthermore, the round robin policy can also become expensive as drive capacities and table sizes continue to increase, thereby also increasing the amount of data that needs to be written to non-volatile memory.

In certain memory sub-systems, a power loss event may occur before the L2P table has been fully stored to the non-volatile memory device, possibly leaving the L2P table in a state which is inconsistent across the memory devices. For example, after a power loss event, the memory sub-system controller can use the latest saved snapshot before the power loss event for reconstructing the L2P table. However, such a snapshot may not reflect the L2P table updates that might have occurred between the last L2P table drop time (i.e., the time of saving the last snapshot) and the time of the power loss event. Accordingly, in certain memory sub-systems, the memory sub-system controller can further maintain a journal of L2P updates. The memory sub-system controller can record every update to the L2P table in a journal entry of the journal. The journal can be stored on the non-volatile memory device before a power loss event.

After the power loss event, the power loss recovery can involve reconstructing the L2P table by restoring the latest L2P table snapshot followed by replaying the journal entries storing the L2P updates that might have occurred between the last L2P table drop time and the power loss event. However, in order to identify which journal entries need to be replayed (i.e., which journal entries store the L2P updates that have occurred between the last L2P table drop time and the power loss event), the memory sub-system controller needs to look at the time stamp of each journal entry and compare whether the journal entry has a time stamp that is newer than the oldest section of the L2P table. If the time stamp is newer, then that journal entry will need to be replayed. If the time stamp is older, than that journal entry can be skipped (i.e., does not need to be replayed). However, going through the time stamp of each journal entry to identify the journal entries that need to be replayed can take time and thus can be expensive (i.e., the delay in time can result in a delay in time for the memory devices to become operational). Further, once the memory sub-system controller identifies the journal entries that need to be replayed, the memory sub-system controller must replay the identified journal entries (i.e., apply the L2P updates stored on the identified journal entries to the L2P table). Replaying the L2P table involves reading the journal entry and updating (i.e., writing) the L2P table, which takes more time and thus can also be more expensive. Accordingly, effective L2P section drop policies can be desired in order to reconstruct the L2P table to a consistent state while reducing the amount of journal entries that need to be replayed.

Aspects of the present disclosure address the above and other deficiencies by providing a memory sub-system that manages power loss recovery using a dirty section write policy for an address mapping table. A memory sub-system controller can maintain a set of sections of an L2P table cached in a volatile memory device. The memory sub-system controller can keep track of a total dirty count for the L2P table. The total dirty count can reflect a total number of updates to the L2P table. The memory sub-system controller can further keep track of a respective dirty count for each section of the L2P table. The respective dirty count for each section can reflect a total number of updates to a particular section of the L2P table. The memory sub-system controller can determine whether the total dirty count satisfies a threshold criterion (e.g., the total dirty count is greater than or equal to a threshold value). For example, the threshold criterion can represent a maximum dirty count for the L2P table and can be based on a target amount of journal replays (i.e., a desired, maximum number of journal entries) to be replayed during a reconstruction of the L2P table after a power loss event. If the memory sub-system controller determines that the total dirty count satisfies the threshold criterion, the memory sub-system controller can identify a section of the L2P table with the highest section dirty count. The memory sub-system controller can write the dirty entries of the identified section to a non-volatile memory device. In response to writing the dirty entries of the identified section to the non-volatile memory device, the memory sub-system controller can decrement the total dirty count by the section dirty count for the identified section. The memory sub-system controller can also set the section dirty for the identified section to an initial value (e.g., 0). The memory sub-system controller can then identify another section of the L2P table with the highest section dirty count and write the dirty entries of that section to the non-volatile memory device.

Advantages of the present disclosure include, but are not limited to, reducing the amount of journal entries that needs to be replayed during a reconstruction of an L2P table following a power loss event. Since the memory sub-system controller can monitor the total number of dirty entries that are in the L2P table and write the dirty entries of the dirtiest section to a non-volatile memory device once the total number of dirty entries satisfies a threshold criterion, the memory sub-system can ensure that the journal entries for those dirty entries that have been written to the non-volatile memory device do not need to be replayed after a power loss event and can thus be skipped. When conventional memory sub-systems use a round robin policy where a section is written to non-volatile memory devices without regard to whether there are dirty entries within the section, there can be more journal entries that need to be replayed, as discussed above. In contrast, by controlling the total number of dirty entries in the L2P table and writing the dirtiest sections of the L2P table to the non-volatile memory device, the memory sub-system controller can reduce the amount of journal entries that need to be replayed. There can thus be an improvement in the amount of time it takes to recover following a power loss event.

Figure 1:
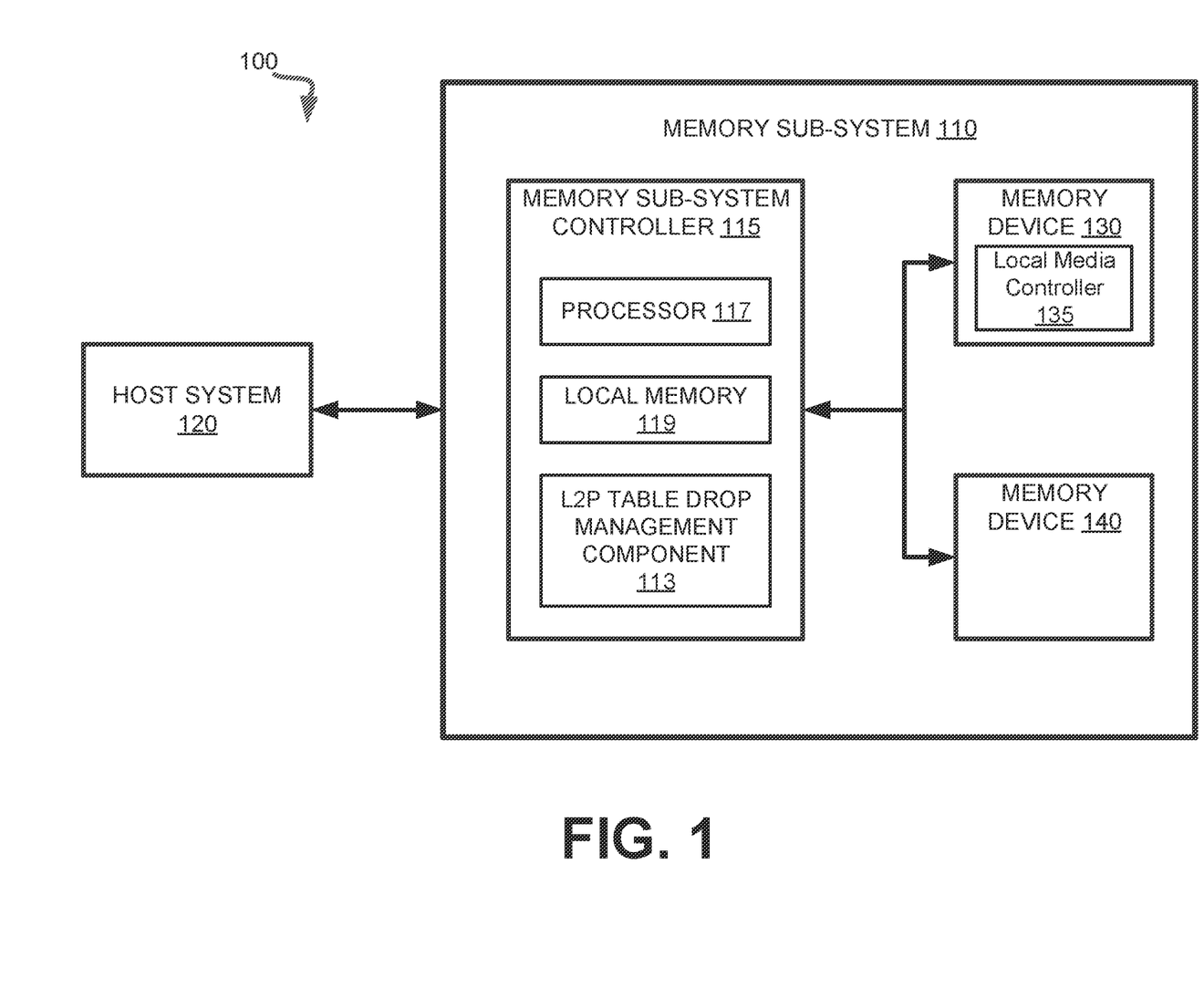
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD).

Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes an L2P table drop management component 113 that can manage power loss recovery using a dirty section write policy for an address mapping table. In some embodiments, the memory sub-system controller 115 includes at least a portion of the L2P table drop management component 113. In some embodiments, the L2P table drop management component 113 is part of the host system 110, an application, or an operating system. In other embodiments, local media controller 135 includes at least a portion of L2P table drop management component 113 and is configured to perform the functionality described herein.

The L2P table drop management component 113 can maintain a set of sections of an L2P table cached in a volatile memory device, such as memory device 140. The L2P table drop management component 113 can keep track of a total dirty count for the L2P table. The total dirty count can reflect a total number of updates to the L2P table. The L2P table drop management component 113 can further keep track of a respective dirty count for each section of the L2P table. The respective dirty count for each section can reflect a total number of updates to a particular section of the L2P table. The L2P table drop management component 113 can determine whether the total dirty count satisfies a threshold criterion (e.g., the total dirty count is greater than or equal to a threshold value). For example, the threshold criterion can represent a maximum dirty count for the L2P table and can be based on a target amount of journal replays (e.g., a desired, maximum number of journal entries) to be replayed during a reconstruction of the L2P table after a power loss event. If the L2P table drop management component 113 determines that the total dirty count satisfies the threshold criterion, the L2P table drop management component 113 can identify a section of the L2P table with the highest section dirty count. The L2P table drop management component 113 can write the dirty entries of the identified section to a non-volatile memory device, such as memory device 130. In response to writing the dirty entries of the identified section to the non-volatile memory device 130, the L2P table drop management component 113 can decrement the total dirty count by the section dirty count for the identified section. The L2P table drop management component 113 can also set the section dirty for the identified section to an initial value (e.g., 0). The L2P table drop management component 113 can then identify another section of the L2P table with the highest section dirty count and write the dirty entries of that section to the non-volatile memory device. Further details with regards to the operations of the L2P table drop management component 113 are described below.

Figure 2:
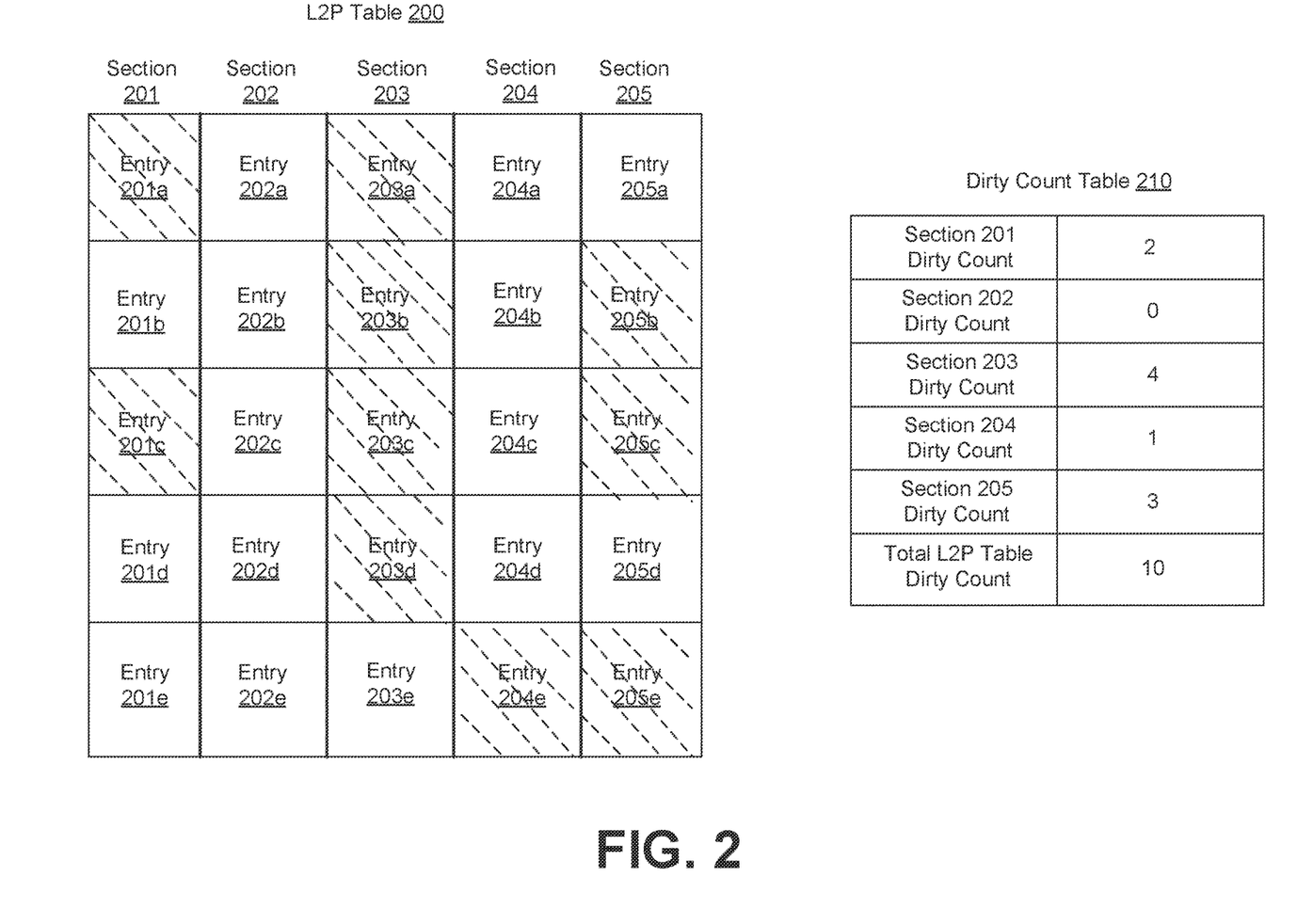
FIG. 2 is a block diagram illustrating sections of a logical-to-physical (L2P) mapping table.

FIG. 2 is a block diagram illustrating a set of sections of an L2P table 200, in accordance with some embodiments of the present disclosure. An L2P table can have multiple sections. In one embodiment, each section of the L2P table can include 4K units (i.e., regions). Each region can include a number of entries, e.g., 1024 entries. Each entry can include a number of bits, e.g., 32 bits. For example, as illustrated in FIG. 2, an L2P table 200 can have a set of sections including Section 201, Section 202, Section 203, Section 204, and Section 205. Each section can include a number of entries. For example, Section 201 can include Entry 201a-Entry 201c; Section 202 can include Entry 202a-Entry 202e; Section 203 can include Entry 203a-Entry 203e; Section 204 can include Entry 204a-Entry 204c; Section 205 can include Entry 205a-Entry 205c. An entry in a section that is dirty (i.e., has been updated) is illustrated using dashed lines. For example, FIG. 2 illustrates that Entry 201a, Entry 201c, Entry 203a, Entry 203b, Entry 203c, Entry 203d, Entry 204c, Entry 205b, Entry 205c, and Entry 205e are dirty entries. In some embodiments of the present disclose, an L2P table drop management component (i.e., the L2P table drop management component 113 of FIG. 1) can keep track of the dirty count for each section of the L2P table and a total dirty count for the entire L2P table, e.g., in a table stored on a memory device, such as local memory 119 or memory device 140. For example, as illustrated in FIG. 2, an L2P table drop management component can maintain a dirty count table 210, which stores the dirty count for each section of the L2P table 200 and a total dirty count for the L2P table 200. FIG. 2 illustrates that Section 201 has a dirty count of 2, Section 202 has a dirty count of 0, Section 203 has a dirty count of 4, Section 204 has a dirty count of 1, and Section 205 has a dirty count of 3. The total dirty count for the L2P table is 10 (i.e., a sum of the dirty count for each section). Further details with regard to the L2P table drop management component 113 and the L2P table 200 are described herein below.

Figure 3:
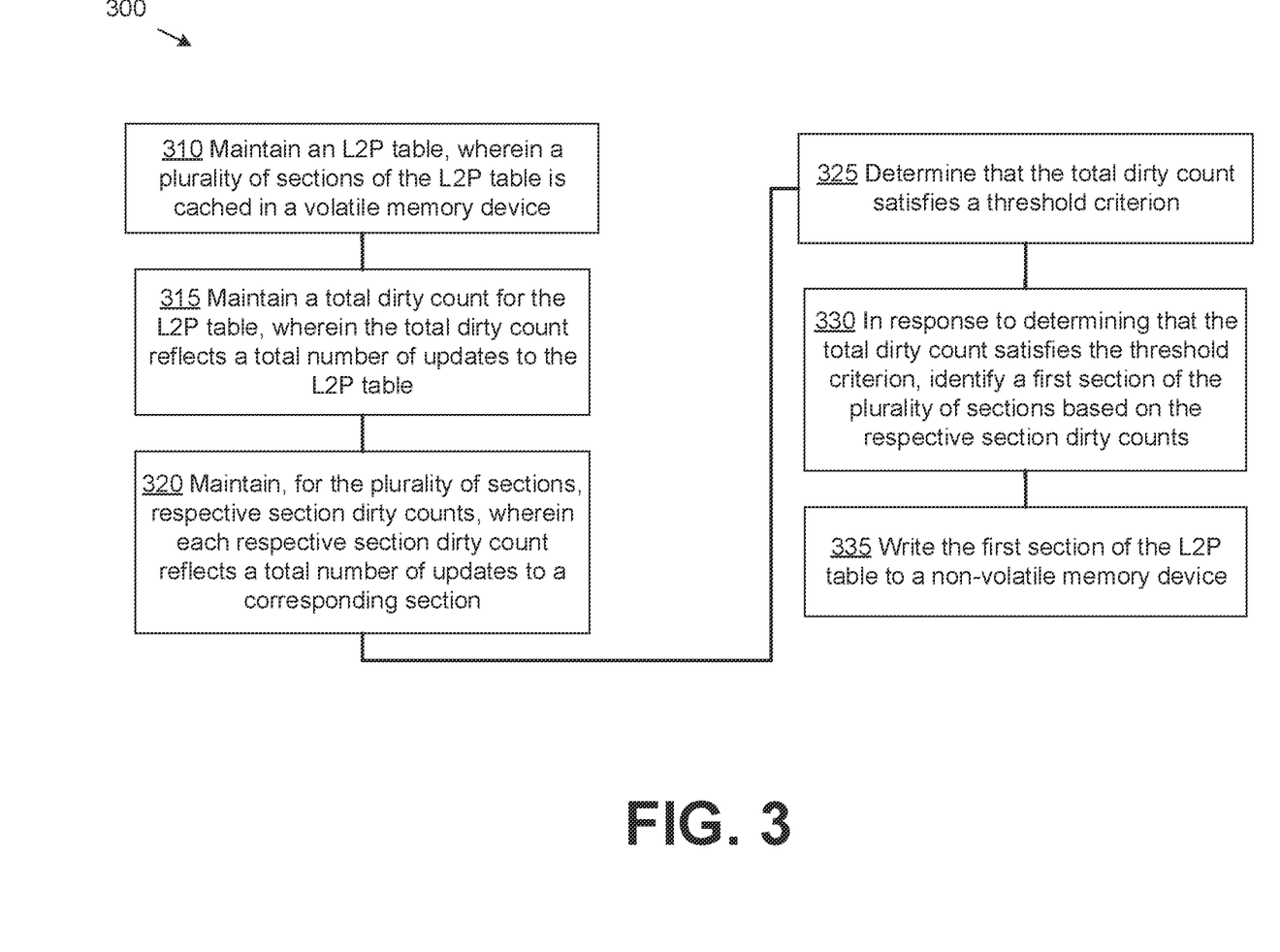
FIG. 3 is a flow diagram of an example method 300 for managing power loss recovery using a dirty section write policy for an address mapping table in a memory sub-system in accordance with some embodiments of the present disclosure.

FIG. 3 is a flow diagram of an example method 300 to manage power loss recovery using a dirty section write policy for an address mapping table for a memory subsystem, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the L2P table drop management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic maintains a logical-to-physical (L2P) table, such as L2P table 200 illustrated in FIG. 2. The L2P table can be a data structure that includes a set of sections. The set of sections can be cached in a volatile memory device, such as memory device 140. In some embodiments, each section of the L2P table can have 4K units (i.e., regions). Each region of the L2P table can include a set of entries. In some embodiments, each region can include 1024 entries. Each entry can include a logical address mapped to a corresponding physical address.

At operation 315, the processing logic maintains a total dirty count for the L2P table. The total dirty count can reflect a total number of updates to the L2P table. In some embodiments, the processing logic can maintain the total dirty count for the L2P table using a data structure, e.g., the dirty count table 210 illustrated in FIG. 2. In some embodiments, the processing logic can maintain a counter for the entire L2P table. The processing logic can set the counter to an initial value (e.g., 0). The processing logic can increment the counter by an integer value (e.g., 1) for every update to an entry of the L2P table. An entry of the L2P table can be updated in response to a change in the physical address associated with a given logical address. In some embodiments, the processing logic can maintain a counter for each section of the L2P table. The processing logic can set the counter for each section to an initial value (e.g., 0). The processing logic can increment the counter for a section by an integer value (e.g., 1) for every update to an entry of the section associated with the counter. In some embodiments, the processing logic can determine the total dirty count for the L2P table by summing the counter for each section of the L2P table.

At operation 320, the processing logic maintains respective section dirty counts for the set of sections of the L2P table. Each respective section dirty count can reflect a total number of updates to the corresponding section of the L2P table. In some embodiments, the processing logic can maintain the respective section dirty counts for the L2P table using a data structure, e.g., the dirty count table 210 illustrated in FIG. 2. In some embodiments, the processing logic can maintain a counter for each section of the L2P table. The processing logic can set the counter for each section to an initial value (e.g., 0). The processing logic can increment the counter for a section by an integer value (e.g., 1) for every update to an entry of the section associated with the counter. The counter for each section can reflect the respective section dirty count.

At operation 325, the processing logic determines that the total dirty count for the L2P table satisfies a threshold criterion. In some embodiments, determining that the total dirty count satisfies the threshold criterion can include comparing the total dirty count to a threshold value. If the total dirty count is greater than or equal to the threshold value, the threshold criterion is satisfied. If the total dirty count is less than the threshold value, the threshold criterion is not satisfied. In some embodiments, the threshold value can be a maximum number of journal entry replays to be performed after a power loss event, as described in more detail herein above. The maximum number of journal entry replays can be set based on the characteristics of the drive. In some embodiments, the maximum number of journal entry replays can be 10 million journal entry replays.

At operation 330, the processing logic can identify a section of the set of sections of the L2P table. In some embodiments, the processing logic identifies the section of the set of sections in response to determining that the total dirty count for the L2P table satisfies the threshold criterion. In some embodiments, the processing logic identifies the section of the set of sections based on the respective section dirty counts for the set of sections of the L2P table. Identifying the section can include comparing the section dirty count for each section and identifying the section with the highest section dirty count. The processing logic can compare the section dirty count for each section by looking up the dirty count for each section of the L2P table in a data structure, e.g., the dirty count table 210 as illustrated in FIG. 2. The processing logic can identify the section with a dirty count with the highest value, i.e., the highest section dirty count.

At operation 335, the processing logic writes the section identified at operation 330 to a non-volatile memory device. In some embodiments, writing the section to the non-volatile memory device can include identifying one or more dirty entries of the section and writing the identified dirty entries of the section to the non-volatile memory device. Identifying the one or more dirty entries of the section can include identifying the entries of the section that have been updated. In some embodiments, the one or more dirty entries written to the non-volatile memory device can be used to reconstruct the L2P table following a power loss event. In some embodiments, in response to writing the section of the L2P table to the non-volatile memory device, the processing logic can decrement the total dirty count for the L2P table by the respective section dirty count for the section. The processing logic can update the dirty count table (e.g., the dirty count table 210 illustrated in FIG. 2) with the value of the decremented total dirty count. In some embodiments, in response to writing the section of the L2P table to the non-volatile memory device, the processing logic can set the respective section dirty count for the section to an initial value (e.g., 0). The processing logic can update the dirty count table (e.g., the dirty count table 210 illustrated in FIG. 2) with the initial value for the section. In some embodiments, in response to decrementing the total dirty count, the processing logic can determine that the decremented total dirty count satisfies the threshold criterion. In some embodiments, determining that the decremented total dirty count satisfies the threshold criterion can include comparing the decremented total dirty count to the threshold criterion. If the decremented total dirty count is greater than or equal to the threshold criterion, the decremented total dirty count satisfies the threshold criterion. If the decremented total dirty count is less than the threshold criterion, the decremented total dirty count does not satisfy the threshold criterion. In some embodiments, if the processing logic determines that the decremented total dirty count satisfies the threshold criterion, the processing logic can identify another section of the set of sections of the L2P table. The processing logic can identify the other section by comparing the respective dirty counts for each section and identifying the section with the highest dirty count. The processing logic can write the identified section to the non-volatile memory device as described herein above.

Figure 4:
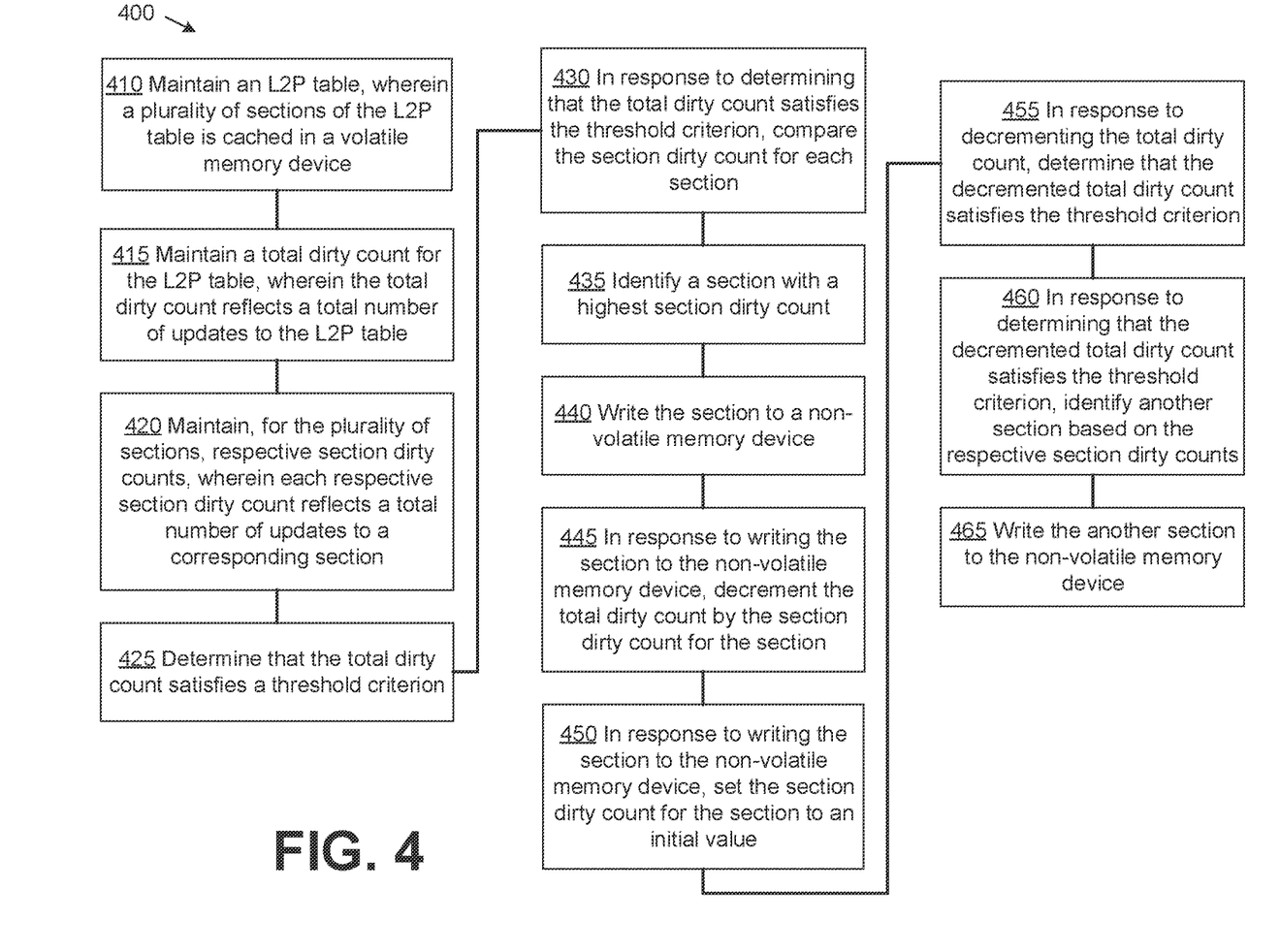
FIG. 4 is a flow diagram of an example method 400 for managing power loss recovery using a dirty section write policy for an address mapping table in a memory sub-system in accordance with some embodiments of the present disclosure.

FIG. 4 is a flow diagram of an example method 400 to manage power loss recovery using a dirty section write policy for an address mapping table for a memory subsystem, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the L2P table drop management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic maintains a logical-to-physical (L2P) table, such as L2P table 200 as illustrated in FIG. 2. The L2P table can be a data structure that includes a set of sections. The set of sections can be cached in a volatile memory device, such as memory device 140. In some embodiments, each section of the L2P table can have 4K units (i.e., regions). Each region of the L2P table can include a set of entries. In some embodiments, each region can include 1024 entries. Each entry can include a logical address mapped to a corresponding physical address.

At operation 415, the processing logic maintains a total dirty count for the L2P table. The total dirty count can reflect a total number of updates to the L2P table. In some embodiments, the processing logic can maintain the total dirty count for the L2P table using a data structure, e.g., the dirty count table 210 illustrated in FIG. 2. In some embodiments, the processing logic can maintain a counter for the entire L2P table. The processing logic can set the counter to an initial value (e.g., 0). The processing logic can increment the counter by an integer value (e.g., 1) for every update to an entry of the L2P table. An entry of the L2P table can be updated in response to a change in the physical address associated with a given logical address. In some embodiments, the processing logic can maintain a counter for each section of the L2P table. The processing logic can set the counter for each section to an initial value (e.g., 0). The processing logic can increment the counter for a section by an integer value (e.g., 1) for every update to an entry of the section associated with the counter. In some embodiments, the processing logic can determine the total dirty count for the L2P table by summing the counter for each section of the L2P table.

At operation 420, the processing logic maintains respective section dirty counts for the set of sections of the L2P table. Each respective section dirty count can reflect a total number of updates to the corresponding section of the L2P table. In some embodiments, the processing logic can maintain the respective section dirty counts for the L2P table using a data structure, e.g., the dirty count table 210 illustrated in FIG. 2. In some embodiments, the processing logic can maintain a counter for each section of the L2P table. The processing logic can set the counter for each section to an initial value (e.g., 0). The processing logic can increment the counter for a section by an integer value (e.g., 1) for every update to an entry of the section associated with the counter. The counter for each section can reflect the respective section dirty count.

At operation 425, the processing logic determines that the total dirty count for the L2P table satisfies a threshold criterion. In some embodiments, determining that the total dirty count satisfies the threshold criterion can include comparing the total dirty count to a threshold value. If the total dirty count is greater than or equal to the threshold value, the threshold criterion is satisfied. If the total dirty count is less than the threshold value, the threshold criterion is not satisfied. In some embodiments, the threshold value can be a maximum number of journal entry replays to be performed after a power loss event, as described in more detail herein above. The maximum number of journal entry replays can be set based on the characteristics of the drive. In some embodiments, the maximum number of journal entry replays can be 10 million journal entry replays.

At operation 430, the processing logic compares the section dirty count for each section. In some embodiments, the processing logic compares the section dirty count for each section in response to determining that the total dirty count satisfies the threshold criterion. The processing logic can compare the section dirty count for each section by looking up the dirty count for each section of the L2P table in a data structure, e.g., the dirty count table 210 as illustrated in FIG. 2.

At operation 435, the processing logic identifies a section with the highest section dirty count. In some embodiments, the processing logic identifies the section with the highest section dirty count in response to comparing the section dirty count for each section as described at operation 430. In response to comparing the section dirty count for each section, the processing logic can identify the section with a dirty count with the highest value, i.e., the highest section dirty count.

At operation 440, the processing logic writes the section identified at operation 330 to a non-volatile memory device. In some embodiments, writing the section to the non-volatile memory device can include identifying one or more dirty entries of the section and writing the identified dirty entries of the section to the non-volatile memory device. Identifying the one or more dirty entries of the section can include identifying the entries of the section that have been updated. In some embodiments, the one or more dirty entries written to the non-volatile memory device can be used to reconstruct the L2P table following a power loss event.

At operation 445, the processing logic decrements the total dirty count for the L2P table by the respective section dirty count for the section. In some embodiments, the processing logic decrements the total dirty count in response to writing the section to the non-volatile memory device. The processing logic can update the dirty count table (e.g., the dirty count table 210 illustrated in FIG. 2) with the value of the decremented total dirty count.

At operation 450, the processing logic sets the respective section dirty count for the section to an initial value (e.g., 0). In some embodiments, the processing logic sets the respective section dirty count for the section to an initial value in response to writing the section to the non-volatile memory device. The processing logic can update the dirty count table (e.g., the dirty count table 210 illustrated in FIG. 2) with the initial value for the section.

At operation 455, the processing logic determines that the decremented total dirty count satisfies the threshold criterion. In some embodiments, the processing logic determines that the decremented total dirty count satisfies the threshold criterion in response to decrementing the total dirty count. In some embodiments, determining that the decremented total dirty count satisfies the threshold criterion can include comparing the decremented total dirty count to the threshold criterion. If the decremented total dirty count is greater than or equal to the threshold criterion, the decremented total dirty count satisfies the threshold criterion. If the decremented total dirty count is less than the threshold criterion, the decremented total dirty count does not satisfy the threshold criterion.

At operation 460, the processing logic identifies another section of the set of sections of the L2P table. In some embodiments, the processing logic can identify the other section in response to determining that the decremented total dirty count satisfies the threshold criterion. The processing logic can identify the other section by comparing the respective dirty counts for each section and identifying the section with the highest dirty count.

At operation 465, the processing logic writes the identified other section to the non-volatile memory device. In some embodiments, writing the identified other section to the non-volatile memory device can include identifying one or more dirty entries of the identified other section and writing the dirty entries of the identified other section to the non-volatile memory device. Identifying the one or more dirty entries of the section can include identifying the entries of the section that have been updated. In some embodiments, the one or more dirty entries written to the non-volatile memory device can be used to reconstruct the L2P table following a power loss event.

Figure 5:
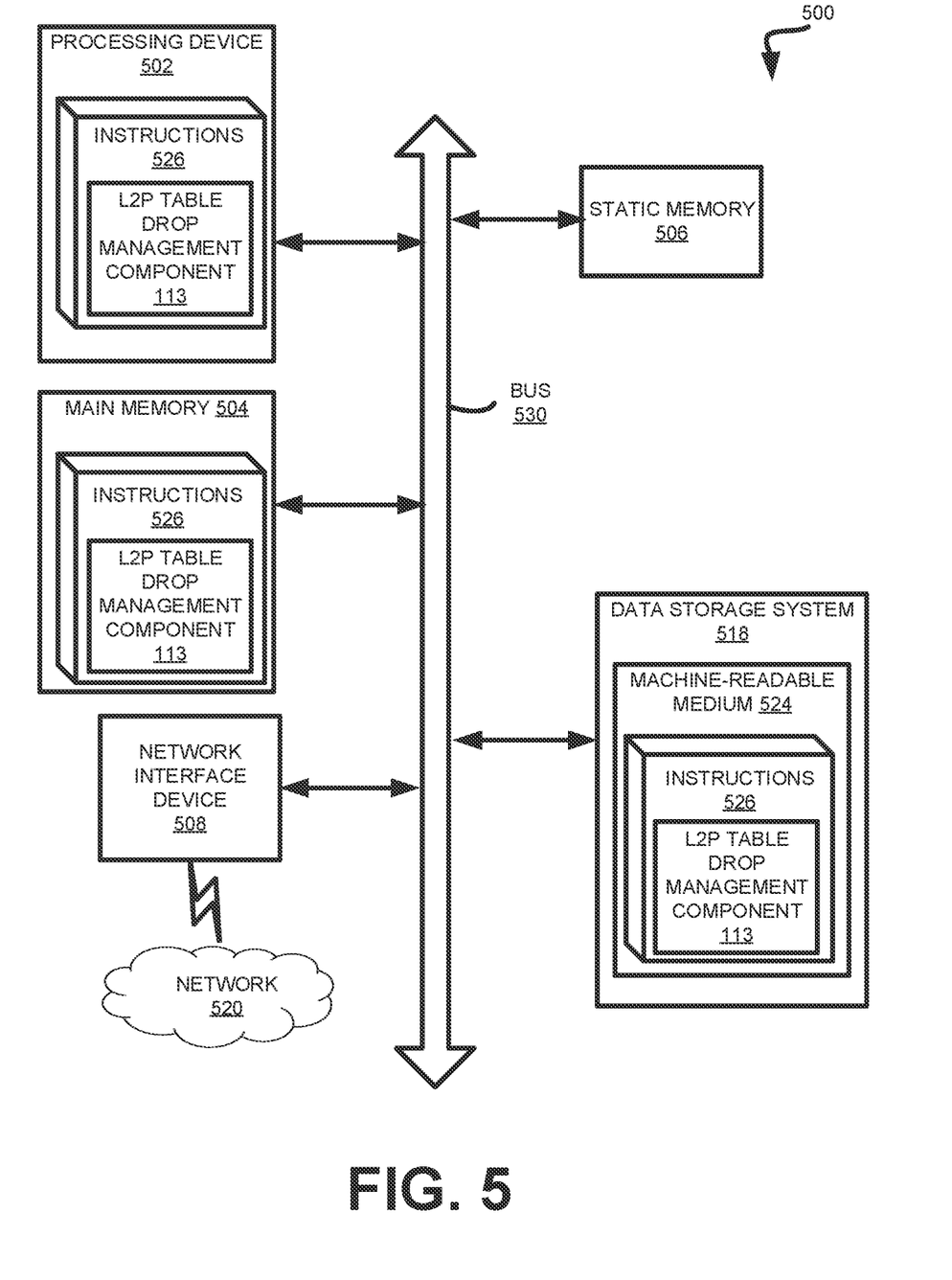
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the L2P table drop management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an L2P table drop management component 113 (e.g., the L2P table drop management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a non-volatile memory device; and
a processing device, operatively coupled with the non-volatile memory device, to perform operations comprising:
   maintaining a total count for an address mapping table, wherein the total count comprises a total number of updates to the address mapping table, and wherein the address mapping table comprises a plurality of sections;
   maintaining, for the plurality of sections, respective section counts, wherein each respective section count comprises a total number of updates to a corresponding section;
   determining that the total count for the address mapping table satisfies a threshold criterion;
   identifying, based on the respective section counts, a first section of the plurality of sections with a highest section count; and
   writing the first section of the address mapping table to the non-volatile memory device.

2. The system of claim 1, further comprising:
in response to writing the first section of the address mapping table to the non-volatile memory device, decrementing the total count by the section count for the first section.

3. The system of claim 1, further comprising:
in response to writing the first section of the address mapping table to the non-volatile memory device, setting the section count for the first section to an initial value.

4. The system of claim 2, further comprising:
in response to decrementing the total count by the section count for the first section, determining that the decremented total count satisfies the threshold criterion;
in response to determining that the decremented total count satisfies the threshold criterion, identifying a second section of the plurality of sections based on the respective section counts; and
writing the second section to the non-volatile memory device.

5. The system of claim 1, wherein identifying the first section of the plurality of sections based on the respective section counts comprises:
comparing the section count for each section; and
identifying a section with a highest section count.

6. The system of claim 1, wherein writing the first section of the address mapping table to the non-volatile memory device comprises:
writing a plurality of dirty entries of the first section of the address mapping table to the non-volatile memory device.

7. The system of claim 1, wherein the threshold criterion is set to keep a number of journal entry replays below a threshold number of journal entry replays during a reconstruction of the address mapping table after a power loss event.

8. A method comprising:
maintaining a total count for an address mapping table, wherein the total count comprises a total number of updates to the address mapping table, and wherein the address mapping table comprises a plurality of sections;

maintaining, for the plurality of sections, respective section counts, wherein each respective section count comprises a total number of updates to a corresponding section;

determining that the total count for the address mapping table satisfies a threshold criterion;

identifying, based on the respective section counts, a first section of the plurality of sections with a highest section count; and writing the first section of the address mapping table to a non-volatile memory device.

9. The method of claim 8, further comprising:

in response to writing the first section of the address mapping table to the non-volatile memory device, decrementing the total count by the section count for the first section.

10. The method of claim 8, further comprising:

in response to writing the first section of the address mapping table to the non-volatile memory device, setting the section count for the first section to an initial value.

11. The method of claim 9, further comprising:

in response to decrementing the total count by the section count for the first section, determining that the decremented total count satisfies the threshold criterion;

in response to determining that the decremented total count satisfies the threshold criterion, identifying a second section of the plurality of sections based on the respective section counts; and writing the second section to the non-volatile memory device.

12. The method of claim 8, wherein identifying the first section of the plurality of sections based on the respective section counts comprises:

comparing the section count for each section; and identifying a section with a highest section count.

13. The method of claim 8, wherein writing the first section of the address mapping table to the non-volatile memory device comprises:

writing a plurality of dirty entries of the first section of the address mapping table to the non-volatile memory device.

14. The method of claim 8, wherein the threshold criterion is set to keep a number of journal entry replays below a threshold number of journal entry replays during a reconstruction of the address mapping table after a power loss event.

15. A non-transitory computer-readable storage medium comprising instructions that, when executed by a processing device, cause the processing device to perform operations comprising:

maintaining a total count for an address mapping table, wherein the total count comprises a total number of updates to the address mapping table, and wherein the address mapping table comprises a plurality of sections;

maintaining, for the plurality of sections, respective section counts, wherein each respective section count comprises a total number of updates to a corresponding section;

determining that the total count for the address mapping table satisfies a threshold criterion;

identifying, based on the respective section counts, a first section of the plurality of sections with a highest section count; and writing the first section of the address mapping table to a non-volatile memory device.

16. The non-transitory computer-readable storage medium of claim 15, wherein the processing device is to perform operations further comprising:

in response to writing the first section of the address mapping table to the non-volatile memory device, decrementing the total count by the section count for the first section.

17. The non-transitory computer-readable storage medium of claim 15, wherein the processing device is to perform operations further comprising:

in response to writing the first section of the address mapping table to the non-volatile memory device, setting the section count for the first section to an initial value.

18. The non-transitory computer-readable storage medium of claim 15, wherein the processing device is to perform operations further comprising:

in response to decrementing the total count by the section count for the first section, determining that the decremented total count satisfies the threshold criterion;

in response to determining that the decremented total count satisfies the threshold criterion, identifying a second section of the plurality of sections based on the respective section counts; and writing the second section to the non-volatile memory device.

19. The non-transitory computer-readable storage medium of claim 15, wherein writing the first section of the address mapping table to the non-volatile memory device comprises:

writing a plurality of dirty entries of the first section of the address mapping table to the non-volatile memory device.

20. The non-transitory computer-readable storage medium of claim 15, wherein the threshold criterion is set to keep a number of journal entry replays below a threshold number of journal entry replays during a reconstruction of the address mapping table after a power loss event.

* * * * *